US011028262B2

(12) United States Patent
Yoshioka et al.

(10) Patent No.: US 11,028,262 B2
(45) Date of Patent: Jun. 8, 2021

(54) RESIN COMPOSITION, ANISOTROPIC CONDUCTIVE FILM INCLUDING THE SAME, AND ELECTRONIC DEVICE

(71) Applicant: Panasonic Intellectual Property Management Co., Ltd., Osaka (JP)

(72) Inventors: Yuki Yoshioka, Fukuoka (JP); Arata Kishi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/298,038

(22) Filed: Mar. 11, 2019

(65) Prior Publication Data

US 2019/0284388 A1    Sep. 19, 2019

(30) Foreign Application Priority Data

Mar. 13, 2018   (JP) .............................. JP2018-045099

(51) Int. Cl.
| | |
|---|---|
| *H01B 1/20* | (2006.01) |
| *H01R 4/00* | (2006.01) |
| *C09J 163/00* | (2006.01) |
| *C08L 63/00* | (2006.01) |
| *C08L 71/12* | (2006.01) |
| *C08K 3/11* | (2018.01) |

(52) U.S. Cl.
CPC ............... *C08L 63/00* (2013.01); *C08K 3/11* (2018.01); *C08L 71/12* (2013.01); *H01B 1/20* (2013.01); *C08K 2201/001* (2013.01)

(58) Field of Classification Search
CPC .. H01B 1/22; H01B 1/20; C09J 163/00; C09J 9/02; H01R 4/04; H01R 12/52; H01R 4/00; H01R 4/02; H01R 12/50; C08L 63/00
See application file for complete search history.

(56) References Cited

U.S. PATENT DOCUMENTS

| | | | | |
|---|---|---|---|---|
| 5,430,112 | A * | 7/1995 | Sakata | C08G 59/184 525/504 |
| 2007/0116961 | A1 * | 5/2007 | Connell | C08G 59/4261 428/413 |
| 2009/0140210 | A1 * | 6/2009 | Toshioka | C08L 63/00 252/500 |
| 2015/0008022 | A1 * | 1/2015 | Masui | H01B 1/22 174/257 |
| 2017/0309646 | A1 * | 10/2017 | Son | G06F 1/1643 |
| 2018/0186480 | A1 | 7/2018 | Mainz et al. | |

FOREIGN PATENT DOCUMENTS

| | | |
|---|---|---|
| JP | 2006-108523 A | 4/2006 |
| WO | 2016/124275 A1 | 8/2016 |
| WO | 2017/033935 A1 | 3/2017 |

\* cited by examiner

*Primary Examiner* — Haidung D Nguyen
(74) *Attorney, Agent, or Firm* — Pearne & Gordon LLP

(57) ABSTRACT

Disclosed is a resin composition that contains conductive particles, a resin component and a curing agent. The conductive particles contain solder, and the resin component contains an epoxy resin and a phenoxy resin. The curing agent contains a first compound having at least one thiol group and a second compound having an amino group.

9 Claims, 1 Drawing Sheet

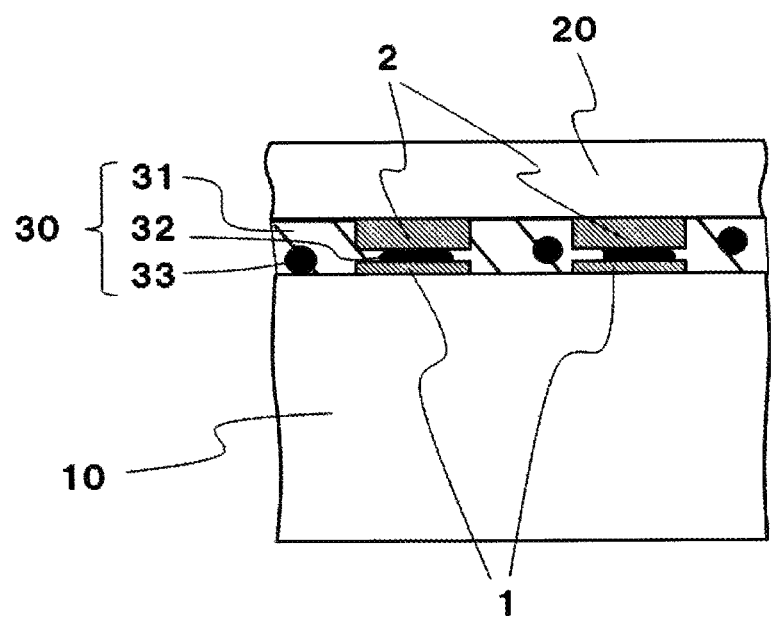

RESIN COMPOSITION, ANISOTROPIC CONDUCTIVE FILM INCLUDING THE SAME, AND ELECTRONIC DEVICE

TECHNICAL FIELD

The present invention relates to a resin composition containing conductive particles, an anisotropic conductive film including the same, and an electronic device.

BACKGROUND ART

In recent years, an anisotropic conductive adhesive is used for bonding between a flexible board and a rigid board and electric connection between an electronic component and a wiring board.

As the anisotropic conductive adhesive, for example, compositions containing an epoxy resin and solder are proposed (Patent Literatures 1 to 3). When an electronic component and a wiring board are thermocompression bonded by using such an anisotropic conductive adhesive, electrodes that are provided on the electronic component and electrodes that are provided on the wiring board come into contact with each other via the solder and are electrically connected. On the other hand, between electrodes that are adjacent to each other on each of the electronic component and the wiring board, a cured product of the epoxy resin is interposed. Accordingly, insulation between adjacent electrodes and adhesion between the electronic component and the wiring board are ensured.

CITATION LIST

Patent Literature

[PTL 1] WO 2016/124275
[PTL 2] WO 2017/033935
[PTL 3] Laid-Open Patent Publication No. 2006-108523

SUMMARY OF INVENTION

Technical Problem

Generally speaking, in order to cure an epoxy resin, it is necessary to allow the epoxy resin to react at a relatively high reaction temperature (for example, 200° C.) for a long length of time (for example, 30 seconds). In the case where a glass board, a glass epoxy board, a flexible printed wiring board or the like is used as a wiring board, when compression bonding is performed at such a high temperature, the wiring board warps and buckles significantly. For example, in the case of implementation on a liquid crystal display (LCD) module which is becoming larger and thinner and whose bezel is becoming narrower, a problem arises in that the display quality deteriorates due to warping and buckling of the wiring board.

Solution to Problem

One aspect of the present invention relates to a resin composition including: conductive particles; a resin component; and a curing agent, wherein the conductive particles contain solder, the resin component contains an epoxy resin and a phenoxy resin, the curing agent contains a first compound having at least one thiol group and a second compound having an amino group.

Another aspect of the present invention relates to an anisotropic conductive film including the resin composition.

A still another aspect of the present invention relates to an electronic device including: a first circuit member; a second circuit member; and a connecting material that connects the first circuit member and the second circuit member, wherein the connecting material is a cured product of the resin composition.

Advantageous Effects of Invention

According to the aspect of the present invention, it is possible to obtain a resin composition that can be cured at a low temperature and in a short period of time.

A novel feature of the present invention is set forth in the appended claims, but the present invention will be more clearly understood, in terms of both configuration and content, from the detailed description given below with reference to the accompanying drawings together with other objects and features of the present invention.

BRIEF DESCRIPTION OF DRAWINGS

FIG. 1 is a cross-sectional view of a relevant part of an electronic device according to an embodiment of the present invention.

DESCRIPTION OF EMBODIMENT

[Resin Composition]
A resin composition according to the present embodiment contains conductive particles, a resin component, and a curing agent. The conductive particles contain solder. The resin component includes an epoxy resin and a phenoxy resin. The curing agent includes a first compound having at least one thiol group (hereinafter referred to as a thiol compound) and a second compound having an amino group (hereinafter referred to as an amine compound).

The resin composition is used as an anisotropic conductive adhesive to connect circuit members such as, for example, to electrically connect an electronic component and a wiring board. The behavior of the resin composition when circuit members are thermocompression bonded via the resin composition is considered to be as follows. First, the solder contained in the resin composition melts. The liquefied solder wet-spreads over the electrodes provided on the circuit members. After that, the resin component starts flowing and then spreads between the circuit members. When the resin composition is further heated, the epoxy resin contained in the resin component starts curing.

Because the resin composition according to the present embodiment contains a thiol compound and an amine compound, the epoxy resin can cure at a relatively low temperature (for example, 100° C. to 140° C.) and in a short period of time (for example, 1 minute or less). Accordingly, the time it takes from when the resin component starts flowing to when the epoxy resin cures is short, and thus the solder is prevented from excessively wet-spreading. Furthermore, because the resin composition contains a phenoxy resin, the resin component is prevented from flowing during thermocompression bonding. Accordingly, it is possible to further prevent melted solder from excessively wet-spreading. After that, when the resin composition is cooled, the wet-spread solder solidifies in that state. As a result, the electrodes provided on the circuit members come into contact with each other via the solder contained in the resin composition and are electrically connected, and at the same time, the circuit members are bonded by the resin component.

The thiol compound functions primarily as a curing agent for curing the epoxy resin. The epoxy resin cross-linked by the thiol compound exhibits high adhesion to the circuit members.

The amine compound functions as a curing agent for curing the epoxy resin, and also enhances the activity of the thiol compound serving as a curing agent.

The amine compound having a nitrogen atom is highly nucleophilic. On the other hand, the thiol compound has a hydrogen atom attached to a highly electronegative sulfur atom. Accordingly, the amine compound preferentially reacts with the thiol compound, and enhances the activity of the hydrogen atom attached to the sulfur atom. Alternatively, the amine compound preferentially withdraws the hydrogen atom attached to the sulfur atom of the thiol compound to ionize the thiol compound and thereby enhance the activity of the thiol compound. As a result of the thiol compound being made active, ring-opening of the epoxy group and an addition reaction associated with the ring-opening are facilitated, and curing of the epoxy resin proceeds rapidly.

(Conductive Particles)

The conductive particles contain solder. The conductive particles containing solder may be solder particles composed only of solder, or may be, for example, particles obtained by covering base particles made of a material other than solder with solder. Also, the resin composition may contain solder-free conductive particles. From the viewpoint of ease of connection by thermocompression bonding at a low temperature, the conductive particles are preferably solder particles composed only of solder. Also, from the same viewpoint, the amount of solder contained in the conductive particles is preferably 90 mass % or more of the total amount of the conductive particles.

The solder contained in the conductive particles is not particularly limited, but preferably has a melting point of 85° C. or more and 150° C. or less. Examples of materials of the solder include metal elements such as tin (Sn), indium (In), and bismuth (Bi), and alloys thereof. The solder may contain one of these elements, or may contain two or more of the same. The solder is preferably made of a tin-bismuth alloy containing tin and bismuth, a tin-bismuth-indium alloy containing tin, bismuth and indium, a bismuth-indium alloy containing bismuth and indium, or the like. In particular, it is preferable to use a bismuth-indium alloy because it has a melting point of 85° C. or more and 100° C. or less. The conductive particles may be made only of one type of solder, or may be made of any combination of two or more types of solder.

The amount of bismuth contained in the solder made of a bismuth-indium alloy is in a range of, for example, 33 mass % or more and 85 mass % or less, and preferably in a range of 40 mass % or more and 85 mass % or less relative to the total amount of bismuth and indium being taken as 100 mass %. When the amount of bismuth is within the above range, the solder can melt at a temperature less than or equal to the curing temperature of the epoxy resin. Also, in the case where the resin composition is used to manufacture an LCD module or the like, a load applied to the resin composition can be reduced. Accordingly, it is possible to significantly reduce a stress applied to the circuit members.

The conductive particles have a particle size in a range of, for example, 1 μm to and preferably 1 μm to 10 μm. When the conductive particles contained in the resin composition have a particle size within the above range, electric connection between the circuit members is further improved. Also, the occurrence of short circuiting between adjacent electrodes provided on the circuit members is further reduced.

The particle size of the conductive particles as used herein refers to a volume-based particle size obtained by using a laser diffraction/scattering particle size distribution analyzer. The particle size of the conductive particles may be adjusted to be in the above range by classifying the conductive particles by using a sieve or the like.

The amount of the conductive particles is in a range of, for example, 1 mass % to 40 mass %, and preferably 3 mass % to 30 mass % relative to the total mass of the resin composition being taken as 100 mass %. When the amount of the conductive particles is within the above range, the reliability of electric connection is ensured, and the occurrence of short circuiting is likely to be reduced.

(Resin Component)

The resin component contains an epoxy resin and a phenoxy resin. The resin composition may contain a resin component such as a thermosetting resin other than the epoxy resin and the phenoxy resin, a thermoplastic resin, and/or a photocurable resin. At this time, the total amount of the epoxy resin and the phenoxy resin contained in the entire resin component is preferably 90 mass % or more.

The epoxy resin has at least one epoxy group within a molecule. The epoxy resin cures by ring opening of the epoxy group and an addition reaction. Epoxy resins can be classified into glycidyl ether-type epoxy resin, glycidyl amine-type epoxy resin, glycidyl ester-type epoxy resin, olefin oxide type (alicyclic) epoxy resin, and the like. Any type of epoxy resin may be used. Specific examples of the epoxy resin include novolac-type epoxy resin (for example, phenol novolac-type epoxy resin, alkyl phenol novolac-type epoxy resin, naphthalene-containing novolac-type epoxy resin, bisphenol novolac-type epoxy resin (bisphenol A novolac-type epoxy resin, bisphenol F novolac-type epoxy resin, etc.), etc.), bisphenol-type epoxy resin (bisphenol A-type epoxy resin, bisphenol F-type epoxy resin, etc.), stilbene-type epoxy resin, naphthalene-type epoxy resin, biphenyl-type epoxy resin, phenol.biphenyl-type epoxy resin, triphenylmethane-type (trisphenol methane-type) epoxy resin, tetrakis phenol ethane-type epoxy resin, alicyclicepoxy resin, cyclohexane-type epoxy resin, adamantane-type epoxy resin, dicyclopentadiene-type epoxy resin, crystalline epoxy resin, and the like. These epoxy resins may be of any of glycidyl ether-type, glycidyl ester-type, and glycidyl amine-type, and one oxygen atom may be attached to adjacent carbon atoms in a ring contained in the epoxy resin to form an epoxy ring. As the glycidyl amine-type epoxy resin, triglycidyl isocyanurate or the like may be used. Also, the epoxy resin may contain a halogen atom such as a bromine atom (for example, bromine-containing epoxy resin). These epoxy resins may be used singly, or may be used in any combination of two or more as needed. For example, a mixture of a crystalline epoxy resin and a novolac-type epoxy resin may be used.

Among these, from the viewpoint of flowability at the time of heating and adhesion after heat curing, the epoxy resin is preferably glycidyl ether-type epoxy resin (specifically, glycidyl ether group-containing epoxy resin), glycidyl amine-type epoxy resin or the like. From the same viewpoint, it is preferable to use phenol novolac-type epoxy resin (bisphenol A-type and bisphenol F-type, etc.), dicyclopentadiene-type epoxy resin, bisphenol-type epoxy resin, biphenyl-type epoxy resin, naphthalene-type epoxy resin, cyclohexane-type epoxy resin, adamantane-type epoxy resin, triglycidyl isocyanurate, or the like.

The epoxy resin has an epoxy equivalent weight (unit: g/eq.) in a range of, for example, 150 or more, preferably 160 to 250, and more preferably 170 to 200. When the epoxy equivalent weight is within the above range, the resin composition exhibits high adhesion. From the same viewpoint, the amount of the epoxy resin is in a range of, for example, 25 mass % to 55 mass %, preferably 30 mass % to 50 mass % of the total mass of the resin composition.

As the epoxy resin, for example, an epoxy resin having a weight average molecular weight smaller than the weight average molecular weight of the phenoxy resin is used. The weight average molecular weight of the epoxy resin may be, for example, less than 30000, preferably 10000 or less, and may be 5000 or less, or 1000 or less. The use of an epoxy resin having a weight average molecular weight within this range is advantageous to shorten the curing time.

In this specification, the weight average molecular weight is measured by gel permeation chromatography (GPC) method or size exclusion chromatography (SEC) method using polystyrene standard.

The phenoxy resin is synthesized by, for example, a reaction between a bisphenol and epichlorohydrin. Due to inclusion of the phenoxy resin, the resin composition can be easily formed into a film. Furthermore, the resulting film is highly flexible. Accordingly, the film can be disposed between circuit members so as to adhere to the circuit members. As a result, even when thermocompression bonding is performed at a low temperature for a short period of time and at a low load, the circuit members can be firmly bonded.

The backbone of the phenoxy resin is not particularly limited. For example, the phenol resin may have a bisphenol A-type backbone, a bisphenol F-type backbone, a bisphenol S-type backbone, a biphenyl backbone, a novolac backbone, a naphthalene backbone, an imide backbone, or the like. The phenoxy resin may have one of these backbones, or may have any combination of two or more. The resin composition may contain one type of phenoxy resin, or may contain any combination of two or more types of phenoxy resins as needed.

The phenoxy resin has a weight average molecular weight in a range of, for example, 30000 or more, preferably 35000 to 100000, and more preferably 38000 to 70000. When the weight average molecular weight is within the above range, the phenoxy resin has a softening point of about 80° C. to about 160° C. Accordingly, the phenoxy resin easily softens and flows during thermocompression bonding, and thus wettability to circuit members is improved. As a result, adhesion between the cured product of the resin composition and the circuit members is improved. Also, when the weight average molecular weight is within the above range, the resin composition can be easily formed into a film.

The flowability of the resin component when the resin composition is thermocompression bonded can be controlled by adjusting the amount of the phenoxy resin. The phenoxy resin suppresses the flowability of the resin component, and thus the solder is prevented from excessively wet-spreading during thermocompression bonding, and thus the reliability of connection between circuit members is improved.

The amount of the phenoxy resin may be, for example, 20 parts by mass to 55 parts by mass, preferably 20 parts by mass to 50 parts by mass, and more preferably 30 parts by mass to 45 parts by mass relative to 100 parts by mass of the epoxy resin. When the amount is within the above range, the resin composition can be more easily formed into a film.

Also, a reduction in the adhesive strength due to insufficient curing of the resin component is likely to be prevented, and thus reliability is improved.

(Curing Agent)

The curing agent contains a thiol compound and an amine compound.

The thiol compound is not particularly limited, and may be any one of a monofunctional compound having a thiol group and a polyfunctional compound having thiol groups. From the viewpoint of increasing adhesion between the cured product of the resin composition and the circuit members, the thiol compound preferably contains at least a polyfunctional mercapto compound, and it is also possible to use a polyfunctional mercapto compound as the thiol compound. The thiol compound may be any of primary, secondary and tertiary thiol compounds. Among these, it is more preferable to use a secondary thiol compound. As used herein, the polyfunctional mercapto compound is a compound having two or more thiol groups (mercapto groups) in a molecule. The number of thiol groups in the polyfunctional mercapto compound is preferably 2 to 10, more preferably 2 to 8, and even more preferably 2 to 4. When the number of thiol groups is large, the film molded from the resin composition is likely to have a high film strength. On the other hand, when the number of thiol groups is small, the storage stability increases. When the number of functional groups is within the above range, both high film strength and high storage stability of the film can be achieved.

Examples of the thiol compound as described above include: mercaptocarboxylic acid esters of polyols [for example, ethylene glycol bisthiopropionate (or ethylene glycol bis(3-mercaptopropionate)), butanediol bisthiopropionate (or butanediol bis (3-mercaptopropionate)), trimethylolpropane tris(3-mercaptopropionate), pentaerythritol tetrakis(3-mercaptopropionate), tetraethylene glycol bis(3-mercaptopropionate), dipentaerythritol hexakis(3-mercaptopropionate), pentaerythritol tetrakis(3-mercaptobutyrate), etc.]; compounds having a mercaptoacyloxy group [for example, 1,4-bis(3-mercaptobutyryloxy)butane, tris[(3-mercaptopropionyloxy)ethyl]isocyanurate, 1,3,5-tris(3-mercaptobutyryloxyethyl)-1,3,5-triazine-2,4,6(1H,3H,5H)-trione, etc.]; polythiol compounds [for example, 1,2-benzenedithiol, 1,3-benzenedithiol, p-xylenedithiol, m-xylenedithiol, 1,2-ethanedithiol, 1,3-propanedithiol, 1,6-hexamethylenedithiol, 2,2'-(ethylenedithio)diethanehiol, di(mercaptoethyl)ether, etc.]; mercaptocarboxylic acids (for example, meso-2,3-dimercapto succinic acid, etc.); polymercaptan; and the like. These thiol compounds are preferably polyfunctional as described above. These thiol compounds may be used singly, or may be used in any combination of two or more as needed.

Among the thiol compounds, it is preferable to use pentaerythritol tetrakis(3-mercaptobutyrate), 1,4-bis(3-mercaptobutyryloxy)butane, and 1,3,5-tris(3-mercaptobutyryloxyethyl)-1,3,5-triazine-2,4,6(1H,3H,5H)-trione, and it is more preferable to use pentaerythritol tetrakis(3-mercaptobutyrate).

The thiol compound may be contained in an amount of 20 parts by mass to 85 parts by mass, preferably 35 parts by mass to 70 parts by mass, and more preferably 40 parts by mass to 65 parts by mass relative to 100 parts by mass of the epoxy resin.

The amino group included in the amine compound may be an amino group having an active hydrogen atom, or may be an amino group that does not have an active hydrogen atom (specifically, a di-substituted amino group (—N<)). The amine compound may have at least one or both of an amino group having an active hydrogen atom and an amino group that does not have an active hydrogen atom. Specific examples of the amino group having an active hydrogen atom include —NH— (a mono-substituted amino group) and —NH$_2$ (an unsubstituted amino group (or a free amino group)). The group —NH— is generally called an imino group.

The amine compound preferably has at least an amino group having an active hydrogen atom. The amine compound may have, for example, at least one of an imino group and a free amino group, or may have at least one of them and a di-substituted amino group. The number of amino groups (specifically, the total number of amino groups having an active hydrogen atom and amino groups that do not have an active hydrogen atom) in the amine compound is not particularly limited, and may be one, two or more. The number of amino groups having an active hydrogen atom in the amine compound may be one, two or more.

The amine compound is not particularly limited. There may be used, for example, an imidazole-series curing agent; an amine adduct curing agent; an imidazole adduct curing agent; an aliphatic polyamine compound; an aromatic polyamine compound; an oxazolidinone ring-containing compound (for example, a compound obtained by reaction of an amineimide compound or a block isocyanate compound with a carbamic acid ester); a salt of an imidazole and a carboxylic acid; a carbamic salt or onium salt of an amine; or the like.

Examples of the imidazole-series curing agent include 1-benzyl-2-methylimidazole, 2-ethyl-4-methylimidazole, 1-isobutyl-2-methylimidazole, 1-cyanoethyl-2-ethyl-4-methylimidazole, 1-benzyl-2-phenylimidazole, 2-phenyl-4-methylimidazole, 2-undecylimidazole, 1,2-dimethylimidazole, 2-phenylimidazole, 1-cyanoethyl-2-methylimidazole, 1-cyanoethyl-2-undecylimidazole, 1-cyanoethyl-2-phenylimidazole, and the like.

The amine adduct curing agent is a reaction product (so-called an epoxy compound amine adduct) of an epoxy compound and an amine compound. Specifically, the amine adduct curing agent is a reaction product obtained by addition reaction of epoxy groups in a monofunctional or polyfunctional epoxy compound with an amine compound, and has one or more active hydrogen atoms in one molecule. The amine compound has at least one amino group, which can be selected from among primary, secondary and tertiary amino groups, in one molecule.

The imidazole adduct curing agent is a reaction product (so-called an epoxy compound imidazole adduct) of an epoxy compound and an imidazole compound.

There may be used, as the aliphatic polyamine compound, for example, a reaction product of an amine compound (e.g., aliphatic amine) and an isocyanate compound (e.g., aliphatic polyisocyanate). Specifically, the aliphatic polyamine compound may be a reaction product obtained by reaction of an aliphatic amine having an amino group having an active hydrogen atom (i.e., >NH and/or —NH$_2$) with a polyisocyanate compound (e.g., diisocyanate compound). The aliphatic amine may be, for example, a dialkylaminoalkyl amine compound or a cyclic amine compound having one or more amino groups each having an active hydrogen atom, or the like.

Examples of the aromatic polyamine compound include metaphenylene diamine, diaminodiphenyl methane, diaminodiphenyl sulfone, modified forms thereof, and the like.

Examples of commercially available products of these amine compounds include: FUJICURE FXE-1000, FUJICURE FXR-1020 and FUJICURE FXR-1081 (all available from T&K TOKA Corporation); AJICURE PN-23, AJICURE PN-H and AJICURE MY-24 (all available from Ajinomoto Fine-Techno Co., Inc.); ADEKA HARDENER EH-4357S, ADEKA HARDENER EH-50305 and ADEKA HARDENER EH-5057P (all available from ADEKA); NOVACURE HX-3742, NOVACURE HXA-3922HP, NOVACURE HX-3088 and NOVACURE HX-3942 (all available from Asahi Kasei Corporation); and the like.

The amine adduct curing agent, the imidazole adduct curing agent, the aliphatic polyamine compound and the aromatic polyamine compound are so-called latent curing agents. Latent curing agents are insoluble in an ordinary liquid epoxy resin at around room temperature (e.g., 20 to 35° C.), but become soluble when heated, and function as curing agents.

These amine compounds may be used singly, or may be used in any combination of two or more as needed. Among these, from the viewpoint of enhancing the storage stability of the film, the resin composition preferably contains an amine compound that is a latent curing agent. Alternatively, the resin composition may contain an amine compound having a structure (microcapsule structure) in which the surface of an amine compound-containing core is covered with a shell that contains an inorganic oxide and/or a synthetic resin.

The amine compound may be contained in an amount of 1 part by mass to 30 parts by mass, preferably 3 parts by mass to 20 parts by mass, and more preferably 5 parts by mass to 10 parts by mass relative to 100 parts by mass of the epoxy resin.

The mass ratio of the amine compound relative to the thiol compound (=amine compound/thiol compound) may be 0.01 to 0.5, preferably 0.05 to 0.35, and more preferably 0.08 to 0.2. When the mass ratio is within the above range, the reaction activity of the thiol compound is further improved by the amine compound.

The resin composition may contain a curing agent other than the thiol compound and the amine compound. As the curing agent, there may be used a known curing agent such as, for example, a polyamide, an acid anhydride, dicyandiamide, a phosphine, or a phosphonium salt. The amount of the thiol compound contained in the entire curing agent is preferably 70 mass % or more. The amount of the amine compound contained in the entire curing agent is preferably 5 mass % or more. When the amounts of the thiol compound and the amine compound are within the above ranges, the resin composition can cure sufficiently in a short period of time of one minute or less even at a low temperature of 100° C. to 140° C. Here, the curing agent contains a compound that is generally called curing accelerator.

The resin composition may further contain, other than the conductive particles, the resin component and the curing agent, a solvent, a coupling agent, an inorganic filler and/or an organic filler.

The resin composition can be produced by mixing, for example, constituent components (the conductive particles, the resin component, the curing agent, and the like) in a mixer or the like. At this time, the phenoxy resin may be dissolved in a solvent in advance and then mixed with another component. The solvent used is not particularly limited as long as it is possible to dissolve the phenoxy resin. From the viewpoint of moldability, for example, solvents having a low vapor pressure and a boiling point of 100° C.

or less (for example, toluene, methylethylketone, ethyl acetate, and the like) are preferably used singly or in a combination.

[Anisotropic Conductive Film]

An anisotropic conductive film according to the present embodiment contains the resin composition described above. A cured product of the anisotropic conductive film is conductive and has a sufficient adhesive strength. The anisotropic conductive film may be a semicured product of the resin composition.

The anisotropic conductive film can be obtained by, for example, dissolving the resin composition in the solvent described above, and thereafter applying the resulting mixture onto release paper so as to have a desired thickness by using a coater (e.g., bar coater), and then removing the solvent. Alternatively, the anisotropic conductive film may be formed by, for example, heating the resin composition, drawing the heated resin composition into a film, and further heating the film to semicure the epoxy resin.

The thickness of the anisotropic conductive film is not particularly limited. The anisotropic conductive film normally has a thickness of 5 μm to 30 μm, and preferably 10 μm to 25 μm. When the thickness is within the range, ease of handling and flexibility of the film are likely to increase.

[Electronic Device]

An electronic device according to an embodiment of the present invention includes a first circuit member, a second circuit member, and a connecting material that connects the first circuit member and the second circuit member. The connecting material is a cured product of the resin composition according to the present embodiment. The resin composition can cure at a low temperature in a short period of time. Accordingly, it is possible to obtain an electronic device that has a good electric connection between circuit members and in which warping and buckling of the connected circuit members are small.

The circuit members used as the first circuit member and the second circuit member are not particularly limited, and semiconductor chips, electronic component packages, wiring boards, connectors and the like can be used. As the first circuit member and the second circuit member, the same circuit member may be used, or different circuit members may be used. Because the resin composition used to connect the first circuit member and the second circuit member can cure at a low temperature in a short period of time, at least one of the first circuit member and the second circuit member may include a glass board, a glass epoxy board or a flexible printed wiring board that is less heat resistant. Even when such circuit members are used, it is possible to obtain an electronic device that has a good electric connection between circuit members and in which the circuit members do not easily warp and buckle after the circuit members are connected. Also, because the resin composition contains a thiol compound, particularly the adhesion between the glass board and the connecting material increases.

The wiring board may include, for example, a transparent board used in a display panel included in a television set, a tablet, a smartphone, a wearable device or the like. The transparent board may be semitransparent. As the transparent board, a glass board or a resin film board may be used. The resin film board is formed of a transparent resin film. The transparent resin film may be made of polyethylene terephthalate (PET), polycarbonate (PC), polyethylene naphthalate (PEN) or the like.

Examples of the electronic device including the first circuit member and the second circuit member described above include an LCD module, a camera module, a hard disk, electronic paper, a touch panel, a printer head, an IC card, a tag, an inner component of a mobile phone, and the like.

FIG. 1 is an enlarged view of a vertical cross section showing a connection portion between a first circuit member 10 and a second circuit member 20, which is a relevant part of an electronic device. The first circuit member 10 and the second circuit member 20 are connected by a cured product of a resin composition 30. At the time of curing of the resin composition, upon heating, the solder contained in the resin composition melts and then solidifies, as a result of which solder portions 32 are formed. Electrodes 1 of the first circuit member 10 and electrodes 2 of the second circuit member 20 are electrically connected to each other by the solder portions 32. A resin portion 31 functions to bond the first circuit member 10 and the second circuit member 20 and also to cover and protect the solder portions 32. With the resin composition according to the present embodiment, the time it takes from when the resin component starts flowing to when the epoxy resin cures is short, and thus the resin component cures rapidly after flowing and covering the solder. Accordingly, the solder is prevented from excessively wet-spreading. In the example shown in the diagram, the resin portion 31 is formed to fill the gap between each solder portion 32 and the electrodes. Conductive particles 33 that do not form the solder portions 32 are dispersed in the resin portion 31, and thus insulation between adjacent electrodes is ensured.

A method for manufacturing an electronic device including a first circuit member and a second circuit member will be described, by taking the case where each of the first circuit member and the second circuit member includes electrodes as an example.

The resin composition according to the present embodiment that serves as a connecting material is provided in a region (hereinafter referred to as a first connection region) that covers at least a portion of the electrodes of the first circuit member. In the case where the resin composition is in the form of an uncured or semicured paste, a printing apparatus, a dispenser, an inkjet nozzle or the like may be used to apply the resin composition to the first connection region. In the case where the resin composition is in the form of a film, the film cut into a predetermined shape and released from the substrate may be compression bonded to the first connection region. Such an operation is performed by using, for example, a known tape applicator. The resin composition may also be provided in a region (hereinafter referred to as a second connection region) that covers at least a portion of the electrodes of the second circuit member, or may be provided in both the first and second connection regions. As a result, a stack structure is obtained in which the first circuit member and the second circuit member are oppositely disposed.

At the time of oppositely disposing the first circuit member and the second circuit member, temporary compression bonding may be performed by heating the resin composition only for a short period of time. It is thereby possible to prevent a positional offset between the first circuit member and the second circuit member. The temporary compression bonding can be performed by heating the resin composition via the second circuit member (or the first circuit member) by using, for example, a heating means such as a heater to such a degree that the solder contained in the resin composition does not melt, and the resin composition cures slightly. The pressure applied to press the first circuit member and/or the second circuit member during temporary compression bonding may be, for example, 0.5 MPa to 1.0 MPa. The temporary compression bonding time may be, for example, about 0.1 seconds to 1 second. The temporary compression bonding temperature may be, for example, a temperature lower than the melting point of the solder by 10° C., or lower than that.

Next, the second circuit member is heated (thermocompression bonded) while it is pressed against the first circuit member so as to melt the solder contained in the resin composition and at the same time cure the resin contained in the resin composition. After that, heating is stopped, and the melted solder solidifies. When the second circuit member is pressed against the first circuit member, the first circuit member is also pressed against the second circuit member. That is, a pressing tool may be applied to either of the circuit members. Through the processing described above, an electronic device including a first circuit member, a second circuit member, and a cured product of the resin composition that connects the first circuit member and the second circuit member is formed.

In the thermocompression bonding step, the temperature for heating the first circuit member and/or the second circuit member is determined as appropriate according to the melting point of the solder contained in the resin composition, the curing temperature of the epoxy resin, and the like. The heating temperature is, for example, preferably 100° C. to 140° C., and more preferably 100° C. to 130° C. The resin composition that connects the first circuit member and the second circuit member cures even at such a low temperature.

The pressure applied to press the first circuit member and/or the second circuit member during thermocompression bonding may be 0.5 MPa to 4 MPa, and desirably about 1 MPa to 2 MPa. Because the solder melts, an electric connection can be easily ensured by wetting between the solder and the electrodes even without application of an excessively high pressure to the circuit members.

The thermocompression bonding time is not particularly limited. However, the thermocompression bonding time is preferably 60 seconds or less, preferably 5 seconds to 30 seconds, and more preferably 5 seconds to 15 seconds from the viewpoint of manufacturing cost and prevention of warping and buckling of the circuit members. The resin composition that connects the first circuit member and the second circuit member cures even in such a short period of time.

Hereinafter, the present invention will be described in further detail by way of examples. However, it is to be understood that the present invention is not limited the examples given below.

Examples 1 to 15 and Comparative Example 1

(Preparation of Resin Composition)

Resin compositions in the form of films were prepared by the following method. The amounts of components contained in each of the resin compositions are shown in Tables 1 and 2.

The components in the amounts shown in Tables 1 and 2 were mixed and kneaded by using a rotation-revolution mixer so as to prepare a paste. The phenoxy resin was dissolved in advance by using toluene and ethyl acetate. The prepared paste was applied to release paper by using a bar coater, and thereafter dried at room temperature. In this way, a resin composition in the form of a film (with a film thickness of 23 μm) was obtained.

The following components were used in Examples 1 to 15 and Comparative Example 1.

Epoxy resin: phenol novolac-type, product name: jER152, epoxy equivalent weight: 176, available from Mitsubishi Chemical Corporation Phenoxy resin: bisphenol A type, product name: PKHC, weight average molecular weight: 43000, available from Tomoe Engineering Co., Ltd.

Thiol compound: product name: Karenz MT-PE1 available from Showa Denko K.K

Amine compound: a latent curing agent, product name: NOVACURE HX-3742 available from Asahi Kasei Corporation Conductive particles: solder particles, Bi—In alloy (55 mass % of Bi and 45 mass % of In), particle size: 1 μm to 6 μm, melting point: 89° C.

(Evaluation of Connection Resistance Value)

A glass board on which indium tin oxide (ITO) was deposited by vapor deposition, and a gold-plated flexible polyimide board were prepared. The glass board had a size of 30 mm×30 mm×0.3 mm, and the ITO film had a thickness of 2000 Å to 2500 Å (angstrom). The flexible polyimide board had a size of 35 mm×16 mm×0.08 mm, and the gold plating had a thickness of 0.03 μm to 0.5 μm.

Each of the resin compositions in the form of films (each having a size of 1.5 mm×15 mm) prepared in Examples 1 to 15 and Comparative Example 1 was placed between the glass board and the flexible board, and pressed at a pressure of 1 MPa for 10 seconds while heated to 130° C. so as to bond them. A bonded body was thereby obtained.

Each bonded body was subjected to thermal shock reliability testing according to the method specified in JIS C 60068-2-14. Low temperature ($T_A$) was set to −40° C., high temperature ($T_B$) was set to 85° C., holding time ($t_1$) was set to 30 minutes, and the number of cycles was set to 1000. The connection resistance value was measured by using a tester (MCD 008 available from Multi Measuring Instruments Co., Ltd.) before and after the testing.

The connection resistance value was evaluated based on the following criteria.

Criterion A: The measured value was less than 10 kΩ.

Criterion B: The measured value was 10 kΩ or more and less than 25 kΩ.

Criterion C: The measured value was 25 kΩ or more.

With the criterion A, the bonding state is very good, and thus stable electric connection can be provided. With the criterion B, a good connection state can be ensured. With the criterion C, the electric connection is unstable, and thus the connection reliability is poor.

The results are shown in Table 1 and Table 2.

TABLE 1

| | | Example | | | | | | | |
|---|---|---|---|---|---|---|---|---|---|
| | | 1 | 2 | 3 | 4 | 5 | 6 | 7 | 8 |
| Resin Composition | Epoxy resin (part by mass) | 100.0 | 100.0 | 100.0 | 100.0 | 100.0 | 100.0 | 100.0 | 100.0 |
| | Phenoxy resin (part by mass) | 45.0 | 40.0 | 40.0 | 30.0 | 50.0 | 40.0 | 40.0 | 40.0 |

TABLE 1-continued

|  |  | Example |  |  |  |  |  |  |  |
|---|---|---|---|---|---|---|---|---|---|
|  |  | 1 | 2 | 3 | 4 | 5 | 6 | 7 | 8 |
|  | Thiol compound (part by mass) | 60.0 | 50.0 | 60.0 | 60.0 | 60.0 | 35.0 | 70.0 | 60.0 |
|  | Amine compound (part by mass) | 10.0 | 10.0 | 5.0 | 10.0 | 10.0 | 10.0 | 10.0 | 3.0 |
|  | Solder particles (mass %) | 22.2 | 22.2 | 22.2 | 22.2 | 22.2 | 22.2 | 22.2 | 22.2 |
|  | Total amount of resin composition (mass %) | 100.0 | 100.0 | 100.0 | 100.0 | 100.0 | 100.0 | 100.0 | 100.0 |
| Evaluation of connection resistance | Before thermal shock reliability testing | A | A | A | A | A | A | A | A |
|  | After thermal shock reliability testing | A | A | A | A | A | A | A | A |

TABLE 2

|  |  | Example |  |  |  |  |  |  | Comp. Ex. |
|---|---|---|---|---|---|---|---|---|---|
|  |  | 9 | 10 | 11 | 12 | 13 | 14 | 15 | 1 |
| Resin Composition | Epoxy resin (part by mass) | 100.0 | 100.0 | 100.0 | 100.0 | 100.0 | 100.0 | 100.0 | 100.0 |
|  | Phenoxy resin (part by mass) | 45.0 | 20.0 | 55.0 | 35.0 | 50.0 | 40.0 | 40.0 | 45.0 |
|  | Thiol compound (part by mass) | 60.0 | 60.0 | 60.0 | 25.0 | 85.0 | 60.0 | 60.0 | 70.0 |
|  | Amine compound (part by mass) | 20.0 | 10.0 | 10.0 | 10.0 | 10.0 | 1.0 | 30.0 | 0 |
|  | Solder particles (mass %) | 22.2 | 22.2 | 22.2 | 22.2 | 22.2 | 22.2 | 22.2 | 22.2 |
|  | Total amount of resin composition (mass %) | 100.0 | 100.0 | 100.0 | 100.0 | 100.0 | 100.0 | 100.0 | 100.0 |
| Evaluation of connection resistance | Before thermal shock reliability testing | A | A | A | B | A | A | A | C |
|  | After thermal shock reliability testing | A | A | B | B | B | B | B | C |

In the bonded bodies obtained by using the resin compositions prepared in Examples 1 to 15, the bonding state was very good even after the thermal shock reliability testing, and stable electric connection was exhibited. Also, the variation in the connection resistance value before and after the thermal shock reliability testing was small, and the bonding state after the testing was good, from which it was found that the resin compositions prepared in Examples 1 to 15 had high adhesion to any of the boards. On the other hand, in Comparative Example 1 in which an amine compound was not blended, the resin composition did not cure completely at 130° C., and thus it was not possible to obtain a bonded body.

From the results above, it was found that it is possible to obtain a favorable cured product even at a low temperature (130° C.) in a short period of time (10 seconds) by using a resin composition containing a thiol compound and an amine compound as curing agents. This is presumably because the reaction of the thiol compound that is a curing agent for curing the epoxy resin is facilitated by the amine compound. With a compound other than the amine compound, the reaction of the thiol compound is not facilitated, and it is therefore difficult to obtain a favorable cured product at a low temperature in a short period of time.

The present invention has been described by way of preferred embodiments at present, but the disclosure should not be construed as liming the scope of the present invention. Various variations and modifications will become clearly apparent to those skilled in the art to which the present invention pertains upon reading the disclosure given above. Accordingly, the scope of the appended claims should be construed to encompass all variations and modifications without departing from the true spirit and scope of the present invention.

INDUSTRIAL APPLICABILITY

The resin composition according to the present invention cures at a low temperature and in a short period of time by thermocompression bonding, and a cured product of the resin composition is conductive and has a sufficient adhesive strength. Also, it can be easily molded into a film. Accordingly, the resin composition according to the present invention is useful as an anisotropic conductive adhesive, and is preferably used as an adhesive for use in various electronic devices including an LCD module and the like. However, the application of the resin composition of the present invention is not limited thereto.

REFERENCE SIGNS LIST

10: first circuit member
1: electrode of first circuit member
20: second circuit member
2: electrode of second circuit member
30: cured product of resin composition
31: resin portion
32: solder portion
33: conductive particles

The invention claimed is:

1. A resin composition comprising:
conductive particles;
a resin component; and
a curing agent,
wherein the conductive particles consist of solder,
the solder contains at least one selected from the group consisting of a tin-bismuth alloy, a tin-bismuth-indium alloy and a bismuth-indium alloy,
the resin component contains an epoxy resin and a phenoxy resin,
the curing agent contains a first compound having at least one thiol group and a second compound having an amino group,
a total amount of the epoxy resin and the phenoxy resin in the resin component is 90 mass % or more,
an amount of the phenoxy resin is 30 parts by mass to 50 parts by mass relative to 100 parts by mass of the epoxy resin,
an amount of the first compound is 35 parts by mass to 70 parts by mass relative to 100 parts by mass of the epoxy resin,
an amount of the second compound is 3 parts by mass to 20 parts by mass relative to 100 parts by mass of the epoxy resin, and
an amount of the conductive particles is 3 mass % to 30 mass % relative to a total mass of the resin composition being taken as 100 mass %.

2. The resin composition in accordance with claim 1, wherein the mass ratio of the second compound relative to the first compound is 0.05 to 0.35.

3. The resin composition in accordance with claim 1, wherein the solder has a melting point of 85° C. or more and 100° C. or less.

4. The resin composition in accordance with claim 1, wherein the solder contains a bismuth-indium alloy.

5. The resin composition in accordance with claim 4, wherein an amount of the bismuth is in a range of 33 mass % or more and 85 mass % or less relative to a total amount of the bismuth and the indium being taken as 100 mass %.

6. An anisotropic conductive film comprising the resin composition in accordance with claim 1.

7. An electronic device comprising:
a first circuit member;
a second circuit member; and
a connecting material that connects the first circuit member and the second circuit member,
wherein the connecting material is a cured product of the resin composition in accordance with claim 1.

8. The electronic device in accordance with claim 7, wherein at least one of the first circuit member and the second circuit member includes at least one selected from the group consisting of a glass board, a glass epoxy board and a flexible printed wiring board.

9. A resin composition consisting of:
conductive particles;
a resin component; and
a curing agent,
wherein the conductive particles contain solder,
the solder contains at least one selected from the group consisting of a tin-bismuth alloy, a tin-bismuth-indium alloy and a bismuth-indium alloy,
the resin component contains an epoxy resin and a phenoxy resin,
the curing agent contains a first compound having at least one thiol group and a second compound having an amino group, and
a total amount of the epoxy resin and the phenoxy resin in the resin component is 90 mass % or more.

* * * * *